US007383299B1

(12) United States Patent
Hailpern et al.

(10) Patent No.: US 7,383,299 B1
(45) Date of Patent: Jun. 3, 2008

(54) SYSTEM AND METHOD FOR PROVIDING SERVICE FOR SEARCHING WEB SITE ADDRESSES

(75) Inventors: Brent Hailpern, Katonah, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/565,395

(22) Filed: May 5, 2000

(51) Int. Cl.
*G06F 15/16* (2006.01)

(52) U.S. Cl. .................. 709/203; 709/219; 709/245; 707/4; 707/5; 707/7; 707/10

(58) Field of Classification Search ............... 709/229, 709/203, 206, 227, 238, 217, 219, 223–224, 709/226, 245; 707/1, 3–7, 10, 503, 533, 707/501.1; 711/1
See application file for complete search history.

(56) References Cited

U.S. PATENT DOCUMENTS

| | | | | |
|---|---|---|---|---|
| 5,978,847 | A * | 11/1999 | Kisor et al. ................. | 709/227 |
| 6,092,100 | A * | 7/2000 | Berstis et al. ............... | 709/203 |
| 6,131,082 | A * | 10/2000 | Hargrave et al. ............. | 707/5 |
| 6,144,958 | A * | 11/2000 | Ortega et al. ................. | 707/5 |
| 6,151,601 | A * | 11/2000 | Papierniak et al. ........... | 707/10 |
| 6,182,142 | B1 * | 1/2001 | Win et al. .................... | 709/229 |
| 6,243,699 | B1 * | 6/2001 | Fish .............................. | 707/2 |
| 6,321,227 | B1 * | 11/2001 | Ryu ............................. | 707/10 |
| 6,321,228 | B1 * | 11/2001 | Crandall et al. .............. | 707/10 |
| 6,353,827 | B1 * | 3/2002 | Davies et al. ................. | 707/6 |
| 6,360,215 | B1 * | 3/2002 | Judd et al. .................... | 707/3 |
| 6,363,377 | B1 * | 3/2002 | Kravets et al. ............... | 707/4 |
| 6,385,602 | B1 * | 5/2002 | Tso et al. ..................... | 707/3 |
| 6,401,118 | B1 * | 6/2002 | Thomas ....................... | 709/224 |
| 6,411,996 | B1 * | 6/2002 | Albers ......................... | 709/223 |
| 6,415,319 | B1 * | 7/2002 | Ambroziak .................. | 709/219 |
| 6,453,353 | B1 * | 9/2002 | Win et al. .................... | 709/229 |
| 6,460,037 | B1 * | 10/2002 | Weiss et al. .................. | 707/10 |
| 6,480,837 | B1 * | 11/2002 | Dutta ........................... | 707/3 |
| 6,487,584 | B1 * | 11/2002 | Bunney ....................... | 709/206 |
| 6,556,984 | B1 * | 4/2003 | Zien ............................. | 707/2 |
| 6,745,177 | B2 * | 6/2004 | Kepler et al. ................. | 707/3 |
| 2001/0020242 | A1 * | 9/2001 | Gupta et al. ............. | 707/501.1 |
| 2001/0037325 | A1 * | 11/2001 | Biderman et al. ............. | 707/1 |

(Continued)

OTHER PUBLICATIONS

Gus venditto, "Netscape's Quite Powver Grab", Internet World, V4 n27 p. 58, Aug. 1998.*

*Primary Examiner*—Oanh Duong
(74) *Attorney, Agent, or Firm*—F. Chau & Associates, LLC

(57) ABSTRACT

A method for searching for a partially specified Uniform Resource Locator (URL) addresses includes receiving a user request, from a user, including a partially specified URL address. A URL search request handler is invoked to search for the partially specified URL address within an inverted index of web site URLs. A web search request handler is invoked to rank the search results of the search for the partially specified URL address based on one or more keywords specified in the user request, a list of recently accessed URLs, and a user profile. Search results are returned to the user comprising a list of URL addresses based on the search for the partially specified URL and ranked based on the user search data.

27 Claims, 11 Drawing Sheets

U.S. PATENT DOCUMENTS

| | | |
|---|---|---|
| 2002/0069220 A1* | 6/2002 | Tran .......................... 707/503 |
| 2002/0147880 A1* | 10/2002 | Wang Baldonado ........... 711/1 |
| 2003/0009588 A1* | 1/2003 | Bodlaender ................. 709/238 |
| 2003/0014450 A1* | 1/2003 | Hoffman ..................... 707/533 |
| 2003/0088637 A1* | 5/2003 | Hatano et al. .............. 709/216 |

* cited by examiner

Wildcard Character Searches

| Partially Specified URL with Wildcard characters | Possible Search results | No match |
|---|---|---|
| *price*.com | www.priceline.com<br>www.pricewaterhouse.com<br>www.lowprice.com | www.printerhouse.com |
| www.my*pc.com | www.myfavoritepc.com | www.inmyoldpc.com |
| www.b*n*.com | www.barnesandnoble.com<br>www.bankofny.com | www.anybodyknows.com |

Web site URL database

| Web site URL address | keyword list |
|---|---|
| www.amazon.com | book, CD, DVD, ... |
| www.dell.com | PC, laptop, desktop, ... |
| www.ebay.com | auction, buy, sell, ... |
| ⋮ | |

Figure 5B user profile database

| user id | cookie | last n search results selected | recently accessed URL list | top m keywords | demographic info | | | subject of interests | Peer group inf. |
|---|---|---|---|---|---|---|---|---|---|
| | | | | | age | salary | sex | | |
| JPK | 018567 | dell.com ibm.com | ebay.com, amazon.com, gateway.com, dell.com | PC, book, CD, DVD, laptop, disk, ... | 50 | 100K | M | computer | printer |
| ⋮ | | | | | | | | | |

Maintenance routine

URL Index Builder

SYSTEM AND METHOD FOR PROVIDING SERVICE FOR SEARCHING WEB SITE ADDRESSES

BACKGROUND OF THE INVENTION

1. Technical Field

The present invention relates generally to a system and method for searching on the World Wide Web; specifically, a system and method for locating URLs based on incomplete or partially specified URL entries.

2. Description of the Related Art

As the amount of information available on the World Wide Web (WWW) and usage of the Internet continue to grow, search engines become an important tool to find relevant information. Many Web sites provide services for searching information on the Web, e.g. altavista.com, yahoo.com, lycos.com, excite.com, etc.

Typically, users enter keywords as search terms to find sites having information or content relating to the search terms. Search engines such as those mentioned above build site databases by crawling pages of the Internet, extracting keywords, and building an index of Web pages based on the keywords appearing on the Web pages. A site is found when the keywords entered match keywords in the index. Some search sites include the URL of a Web page as part of the text description of the Web page. Thus, there is no real differentiation between searching the URL and the body of the text. For example, if one specifies "apple" as a search term, sites having the word "apple" in the URL such as www.apple.com or www.appledaily.com would be returned as well as sites which contain "apple" somewhere in the text.

One problem with such a search and match method occurs when a user enters an incomplete or misspelled keyword. The index would yield no match or a wrong match, and the intended website(s) would not be returned. The same occurs when a website address or URL is entered incompletely. In such cases, unless there is a complete match, the user will not be routed to the intended website. For forgetful people, this problem is frequently encountered. For instance, as companies advertise their products over the media (radio, TV, newspaper), they often refer the audience to their websites. However, many people often cannot remember the entire URL heard on the radio or seen on television or in newspapers, thus frustrating the intentions of the advertisers.

As an aside, searching in computers by the use of wildcards designated by symbols (e.g., *, #, ?) is effective in locating words or terms in a document or locating files in memory. Wildcards are commonly used in directory searches in operating systems like UNIX and in text editor searches in editors such as Emacs. For example, when a file search using "*.exe" as a search term is entered, all execution files having the ".exe" extension will be shown as found by the computer, with "*" being a wildcard representing any length of characters.

The application of the above wildcard searching technique would simplify and enhance search and locating capabilities for searching URL addresses. Such search techniques have not heretofore been used but would allows users to locate URL's with entry of a partially specified URL address with wild card characters, such as "*" and "?", where the asterisk represents any string of any length of characters, and the question mark represents any single character.

Accordingly, there is a need for an efficient and effective system and method that allows a partially specified URL entry to be searched on the World Wide Web yielding search results that partially match the partially specified URL entry, wherein the partially specified URL entry can contain wildcard characters, or may be incomplete or misspelled.

SUMMARY OF THE INVENTION

The present invention is directed to a system and method for supporting the searching of a partially specified URL address with wild card characters.

An object of the present invention is to provide a system for facilitating return of URL addresses based on partially specified URL entries.

Another object of the present invention is to provide a system and method for searching URL addresses based on a partially specified URL address that may be incomplete or contain wild card characters, and taking into account user-specified related keywords, the user profile, and recently accessed URL addresses for pruning and ranking the search results.

In one aspect of the present invention, a system for providing service to a user for searching URL addresses on an electronic network comprises: a search site server node having a search request handler for handling partially entered URL addresses and matching incomplete URL addresses to partial URL addresses having a wildcard symbol; a search site server logic for storing, ranking and returning search results; and a client station for entering the partially specified URL address, a related keyword, and for providing information on a recently accessed website URL list.

In another aspect of the present invention, a maintenance routine for building a URL index and updating the user profile database is included in the search site server logic.

In yet another aspect of the present invention, a method is provided for storing URL addresses of different sites in a website URL database, building an index having related keywords in database, providing a partially specified URL address and a keyword, searching the URL database for the sites containing the partially specified URL address, filtering out sites which do not contain the keyword specified, and using profile information, specified keywords and a list of recently accessed URL addresses to rank the remaining sites that partially match the incomplete/incorrect URL address.

These and other aspects, features, and advantages of the present invention will become apparent from the following detailed description of the preferred embodiments, which is to be read in connection with the accompanying drawings.

BRIEF DESCRIPTION OF THE DRAWINGS

FIG. 3B is a chart illustrating a wild card character search where a wild card character is used in a partially specified URL address;

FIG. 5A shows a Web site URL database with a list of keywords for each respective URL address, and FIG. 5B shows a user profile database comprising information on the user;

DETAILED DESCRIPTION OF PREFERRED EMBODIMENTS

It is to be understood that the system modules and method steps described herein are preferably implemented in software as an application comprising program instructions that are tangibly embodied on one or more program storage devices (e.g., RAM, ROM, etc.) and executable by any platform comprising suitable architecture. It is to be further understood that, because the system modules and process steps depicted in the accompanying Figures are preferably implemented in software, the actual connections between such steps may differ depending upon the manner in which the present invention is programmed. Given the teachings herein, one of ordinary skill in the related art will be able to contemplate these and similar implementations or configurations of the present invention.

Figure 1:
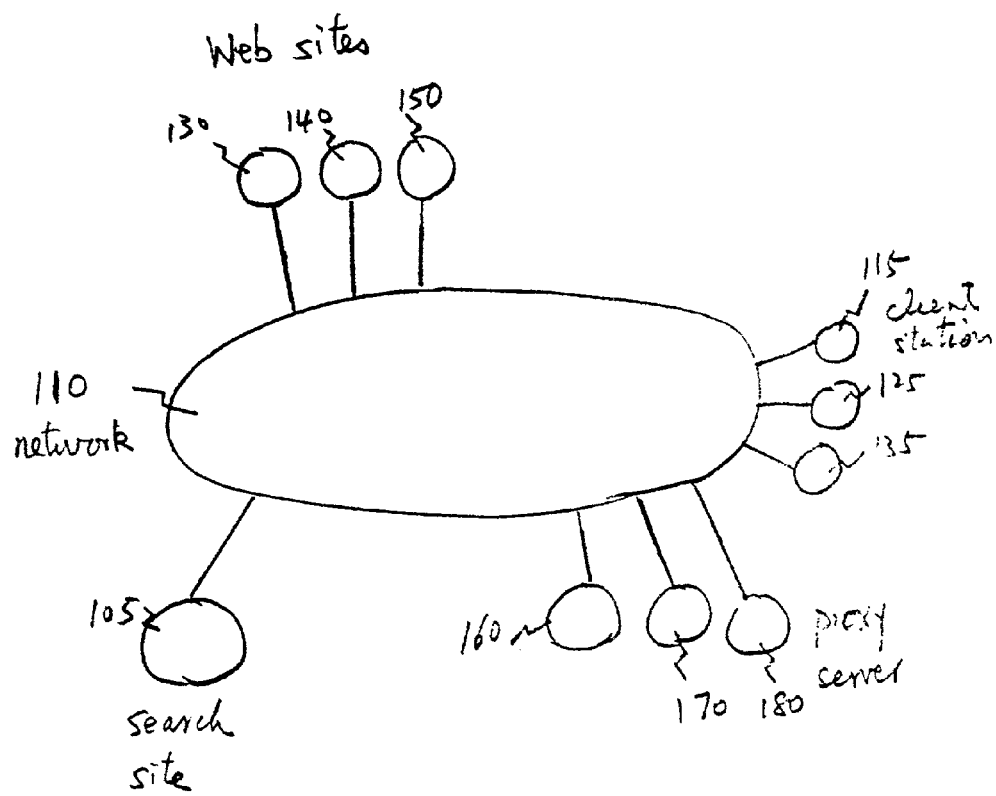
FIG. 1 is a diagram of an environment having features of the present invention.

FIG. 1 depicts an environment having features of the present invention. A Web site (105) providing search service based on a partially specified Web site URL address can be implemented on a computing server. The server and the website can be accessed through the communication network (110), which preferably is a global electronic network such as the Internet. Web sites (130, 140, and 150) are content providers, advertisers, or other sponsors connected to the network. Client stations (115, 125, and 135) access via network (110) all connected websites including the search site 105 via browsers (e.g., Explorer, Navigator) running on client PCs, hand-held, or wireless devices. Some of the client stations may configure their browsers to go through one of proxy servers (160, 170, and 180) to access the various Web sites (130, 140 and 150).

Figure 2:
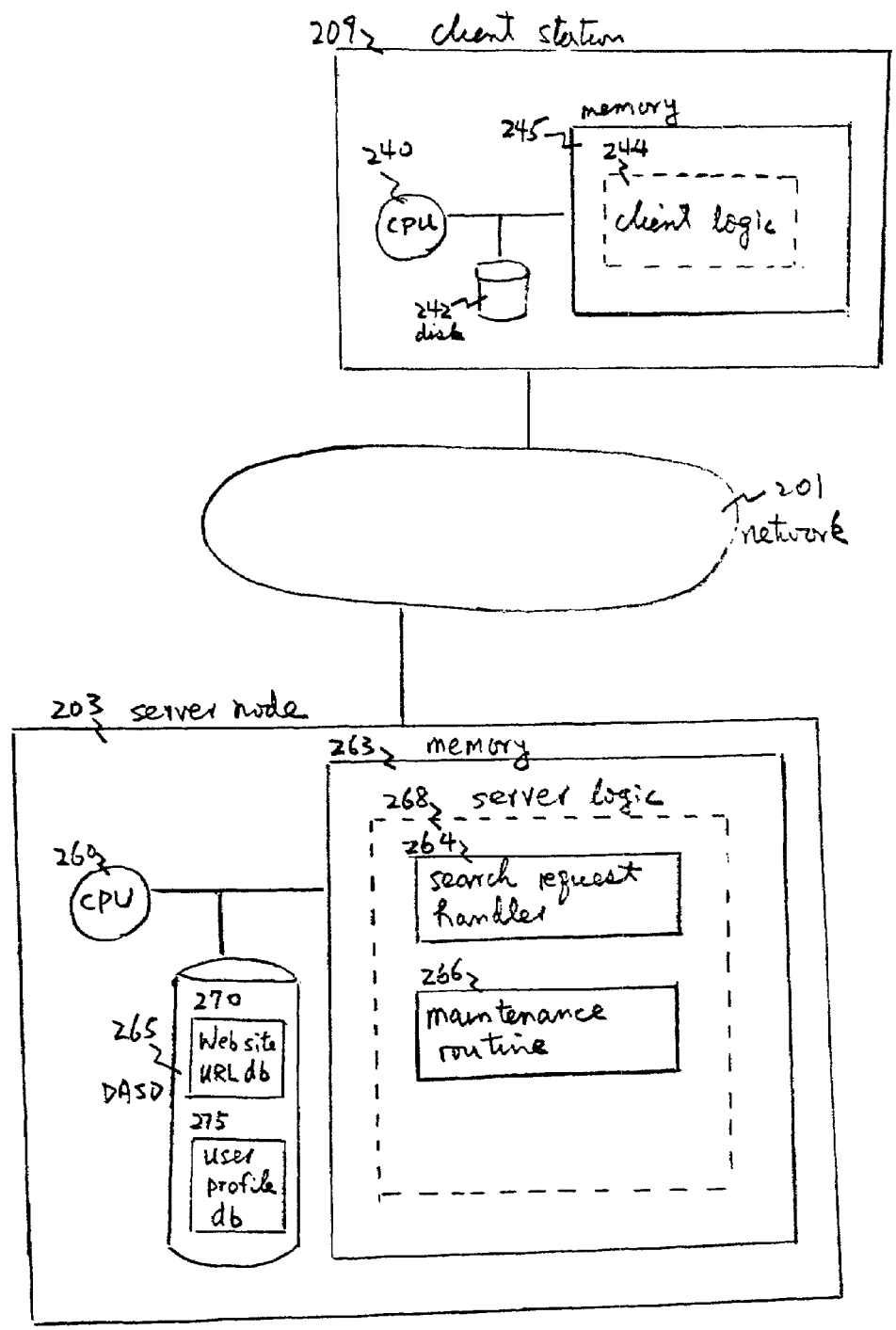
FIG. 2 is an overall architecture of a server and client system according to the present invention.

FIG. 2 depicts a more detailed example of a network (201) and system having features of the present invention. As depicted, a search site server node (203) is used to represent a computing node that can serve search requests through the network (201). The search site server node preferably includes a CPU (260), memory (263) such as RAM, and storage devices (265) such as DASD. The memory (263) stores the search site server logic (268) which provides the search request handler (264) and maintenance routine (266), preferably embodied as a computer executable code which is loaded from DASD (265) into memory (263) for execution by the CPU (260).

The URL search request handler (264) includes code executable by CPU (260) to cause server node (203) to receive users' requests and conduct URL searches based on the users' entries. The maintenance routine (266) includes code executable by CPU (260) for causing server node 203 to build the URL index and update the user profile. These steps will be described in further detail below and in FIG. 6. Search site server logic (268) maintains a Web site URL database (270), which stores the URL addresses of most websites accessible through the Internet, and user profile database (275) which stores information on users.

A representative client station (209) is preferably a networked or stand-alone station. The client station includes a CPU (240), memory (245) such as RAM, and storage devices (242) such as DASD. The memory (245) stores the client logic 244 for processing and sending the user request to the server. The client logic 244 is preferably embodied as computer executable codes which are loaded from DASD (242) into memory (245) for execution by the CPU (240). The client station is preferably a PC, but can be a handheld device such as a Palm Pilot, or a cellular telephone having capability for accessing the Internet, such as by operation of wireless application protocol (WAP).

Figure 3A:
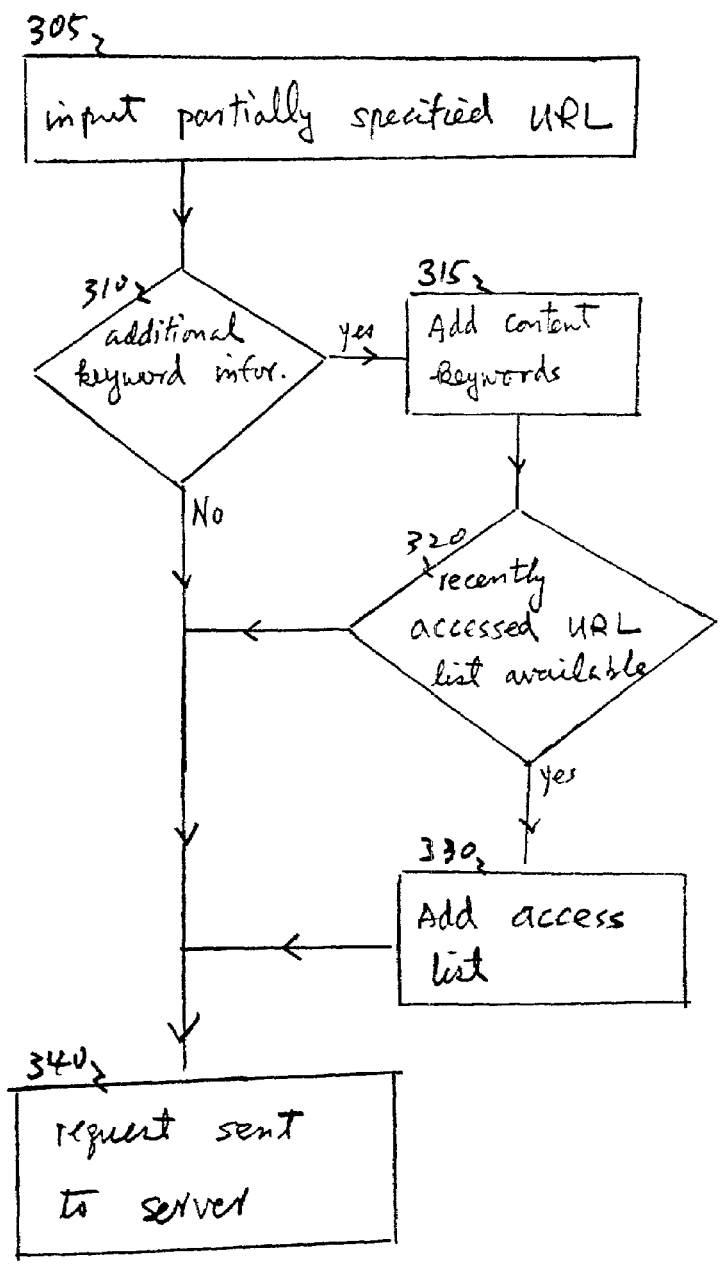
FIG. 3A is a flow chart illustrating exemplary implementation of the client logic of FIG. 2.

FIG. 3A depicts an example of a client routine having features of the present invention. In step 305, the client enters a partially specified Web-site URL address, which can contain wild card characters such as "*" and "?", where "*" represents a string of any length of any character and "?" represents any single character. For example, as illustrated in FIG. 3B, "*price*.com" (350) can represent any URL including the five characters "price" and ending with ".com". The URL, www.priceline.com, will be one of them, whereas the URL www.printerhouse.com will not, since the word "price" does not appear anywhere in the URL. A second example can be "www.my*pc.com" (355), which can include the URL www.myfavoritepc.com, but not www.inmyoldpc.com, because the latter URL contains characters before the letters "my" in the URL. Another example is www.b*n*.com (360), which can include the URLs www.barnesandnoble.com and www.bankofny.com, but not www.anybodyknows.com.

There are also additional types of wildcards in general use for describing partially specified strings (addresses), such as "+" to denote one or more occurrences. Those skilled in the art will also appreciate that any regular expression (a well understood mathematical definition of a class of strings) can be specified and searched using techniques similar to those described in this invention.

It can be seen that such search requests can return with numerous matches. Therefore, the user can narrow down the search results by specifying keywords related to the content of the partially specified address. To illustrate, in FIG. 3A, it's next ascertained whether the user wants to provide additional information in the form of keywords related to the Web site (310). If not, the request and entry is forwarded to the server. If so, in step 315, the user inputs the keywords relating to the site of interest.

In addition, if the search vehicle has additional information on the searcher, such as types of websites visited, types of goods purchased, or the age and sex of the searcher, such information can be used to predict or rank websites returned to the searcher. For example, if a user enters www.buy*.com, the search results may yield www.buypc.com or www.buycar.com. If it is known that the user is computer enthusiast, the www.buypc.com site should be returned with a higher rank than the www.buycar.com site. To illustrate, in step 320, it's ascertained whether the browser can provide information on a history of recently accessed Web site URL lists, for example, the last 50 sites the user has visited. If so, in step 330, the recently accessed URL list is added. In step 340, the request is sent to the server of the search site. An alternative implementation is to let the proxy server provide the recently accessed URL list of a user.

Figure 4:
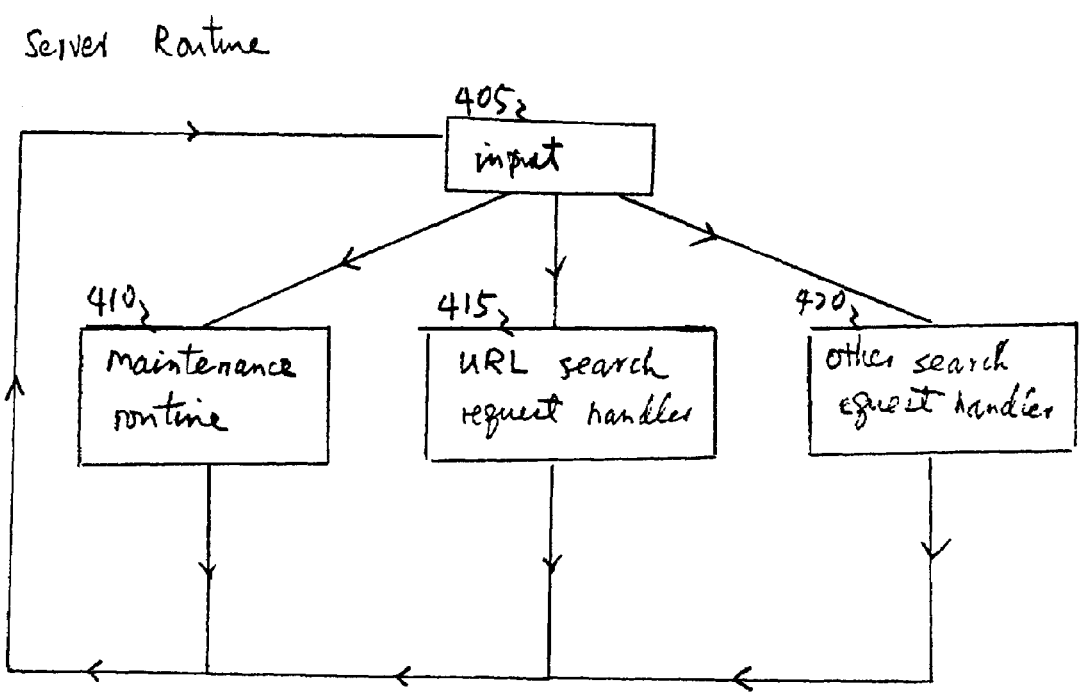
FIG. 4 shows a routine executed by the server logic of FIG. 2.

FIG. 4 depicts an example of a server routine which causes server node (203) to process user requests. In step 405, the server node (203) checks for input from the network. If the input request is for searching based on a partially specified Web site address, the URL search request handler is invoked in step 415 to receive the search requests and return appropriate results. If the input request is for searching based on keywords or other type of searches, in step 420 the other search request handler is invoked. This can be a conventional search engine known to one ordinarily skilled in the art. If the input is for periodic maintenance of the Web site URL address database and user profile database, in step 410 the maintenance routine is invoked.

FIG. 5A depicts a Web site URL database (505) and FIG. 5B depicts a user profile database (510) useable in the present invention. In a preferred embodiment, the Web site URL database contains the URL address of most Web sites accessible through the Internet. Also stored in the database is the top m (say m=30) keywords or words appearing in their respective sites. In this embodiment, the top 3 content keywords are shown for the 3 Web sites listed. As shown in FIG. 5B, the user profile database of this embodiment includes the following fields for each user: user ID (515), cookie information (518), last n search results selected (520) (e.g., n=5, the search results may be ibm.com or dell.com), the recently accessed URL list (525) (e.g., ebay.com, gateway.com), and the top m (say m=50) keywords (e.g., CD drive, monitors, DVD) from the recently accessed URL list (530). If the search site can get a user to register with it, then additional demographic user information (540) such as age, sex, household income, etc., and subjects of interest (550) (e.g., computers, books) to the user can also be collected and stored in the user profile.

The additional user information can be treated similar to the top m keywords (530) when applied to help rank the search results. For example, the user information is used to rank results in the order that they are most relevant to the user. The search site can also partition or cluster users into peer groups and then derive useful information from the peer group to help rank the search results. The useful information derived from the peer group can also be added to the user profile database. This is referred to in FIG. 5 as peer group information (560). For example, the top m keywords of interest to the peer group, but not included in the top m keyword field (530) of a user, can be included in the peer group information field (560). Therefore, the top keywords of interest to a peer group as a whole are also taken into account through each individual profile. In this way, peer group information (560) is used to narrow down the results of a search to the sites likely to be of interest to the user.

Figure 6:
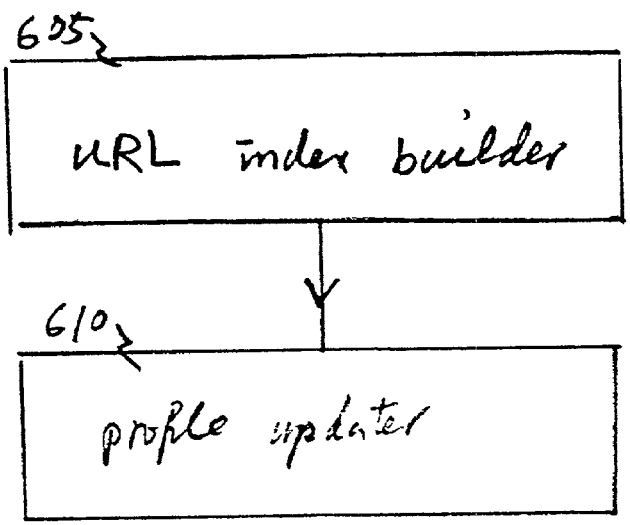
FIG. 6 shows a maintenance routine comprising building a URL index and updating the user profile information.
Figure 7:
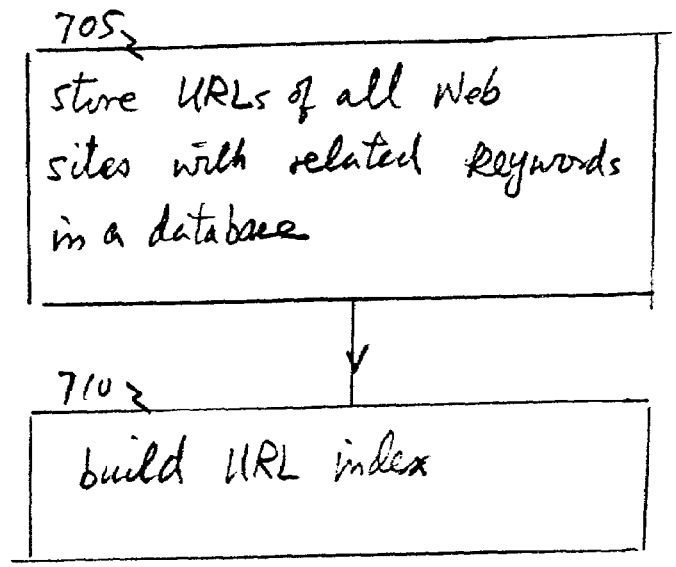
FIG. 7 shows a URL index builder storing the URL's of websites with related keywords in a database and building a URL index.

FIGS. 6 and 7 show an example of a maintenance routine which incorporates a URL index builder routine. In step 605, the URL index builder is invoked which gathers and stores information on URL's and related keywords of websites. In step 610, the profile updater is invoked, which updates the user profile based on information from a server log. The profile updater will be further described below with reference to FIG. 9.

A conventional search engine can be used to crawl the Web to get all Web pages, read the information on the URLs of all Web sites, and select keywords which appear in the Web pages of each site. The keywords selected preferably are based on meta information, such as the "meta" HTML tag in the header of a document, or XML-based semantic information, or PICS-based annotations (on the page or from a remote reputation server). The keywords selected could also be based on the frequency of occurrences, i.e. the most frequently occurring words at a site. In step 705, the URL index builder stores the URLs of all Web sites with related keywords in a database. In step 710, a Web site URL index is built for fast retrieval based on a partially specified URL address. In a preferred embodiment, an inverted index is built based on each character and character string up to a pre-specified length.

Figure 8:
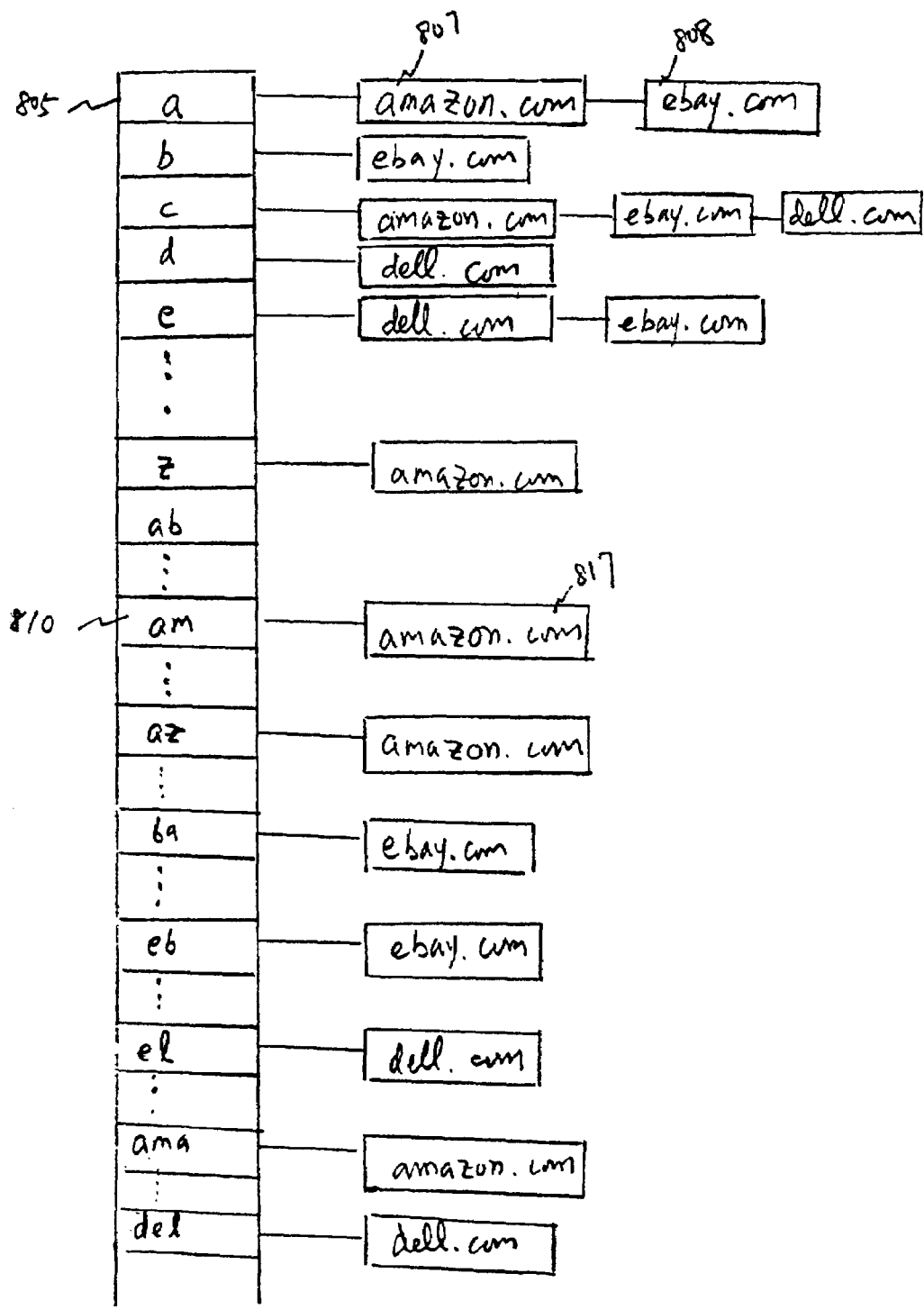
FIG. 8 shows an inverted index for the Web site URL database based on each character and character string up to some pre-specified length.

FIG. 8 illustrates an example of an inverted index built from the Web site URL database according to the present invention. Here the inverted index is shown based on the exemplary Web site database shown in FIG. 5, where the database contains 3 Web site URL entries. For each single character, and string of characters up to length 3, the list of Web site URLs that contain the character or string of characters is listed. For example if the requester input "*a*" as the partially specified URL, the server will follow the links pointed to by "a" (805), which include amazon.com (807) and ebay.com (808). If the requester specify "*am*", the server will follow the links pointed to by "am" (810) which include amazon.com (817), but not ebay.com. The more specific (i.e. the more characters) a request in specifying a Web site, the more precise the search results will be, and the less Web site addresses will be returned. It can be seen that the inverted index can be used to access a URL even if the user entry or search request is incomplete.

Figure 9:
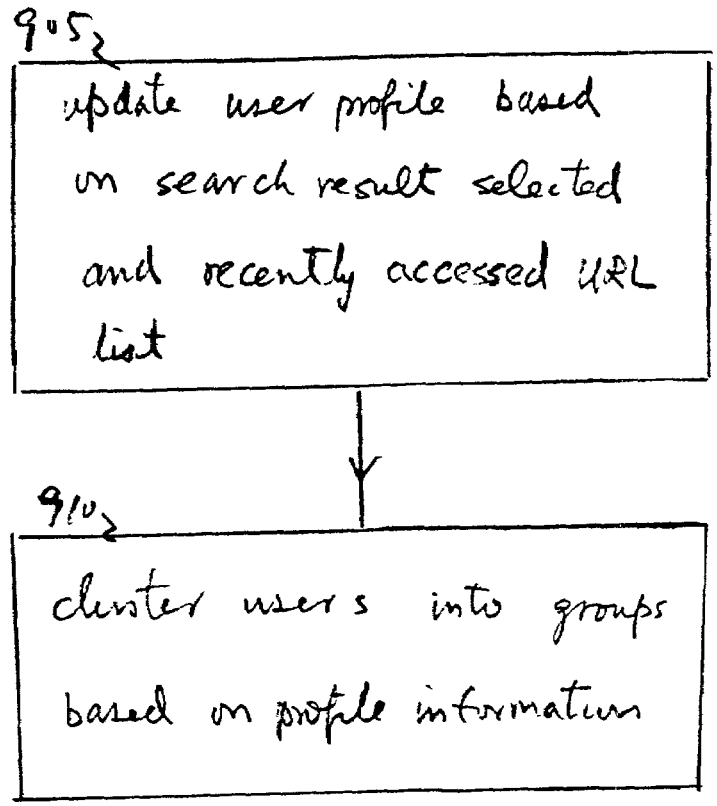
FIG. 9 shows a profile updater for updating a user profile based on a search result selected and recently selected URL's.

FIG. 9 depicts an example of a profile updater for updating the user profile with new information. In step 905, the server updates the user profile based on information from the server log. Specifically, in step 905, the server uses the search result selected and the recently accessed URL list to update the last n search results selected field (520), the recently accessed URL list (525) and the top m keyword field (530) in the user profile. In step 910, the users in the user profile database are clustered or partitioned into peer groups. Commonly assigned U.S. application Ser. No. 09/169,029, filed Oct. 9, 1998 and application Ser. No. 09/070,600, filed Apr. 30, 1998, describe clustering processes applicable to the present invention. The disclosure of the applications are incorporated by reference herein. The clustering can be based on demographic information and/or the recently accessed URL list. The information learned from the peer group of each user is also added to the user profile database in the peer group information field (560). For example, the top m keywords of interest to the peer group, but not included in the top m keyword field of a user, are added to his peer group information field (560).

Figure 10:
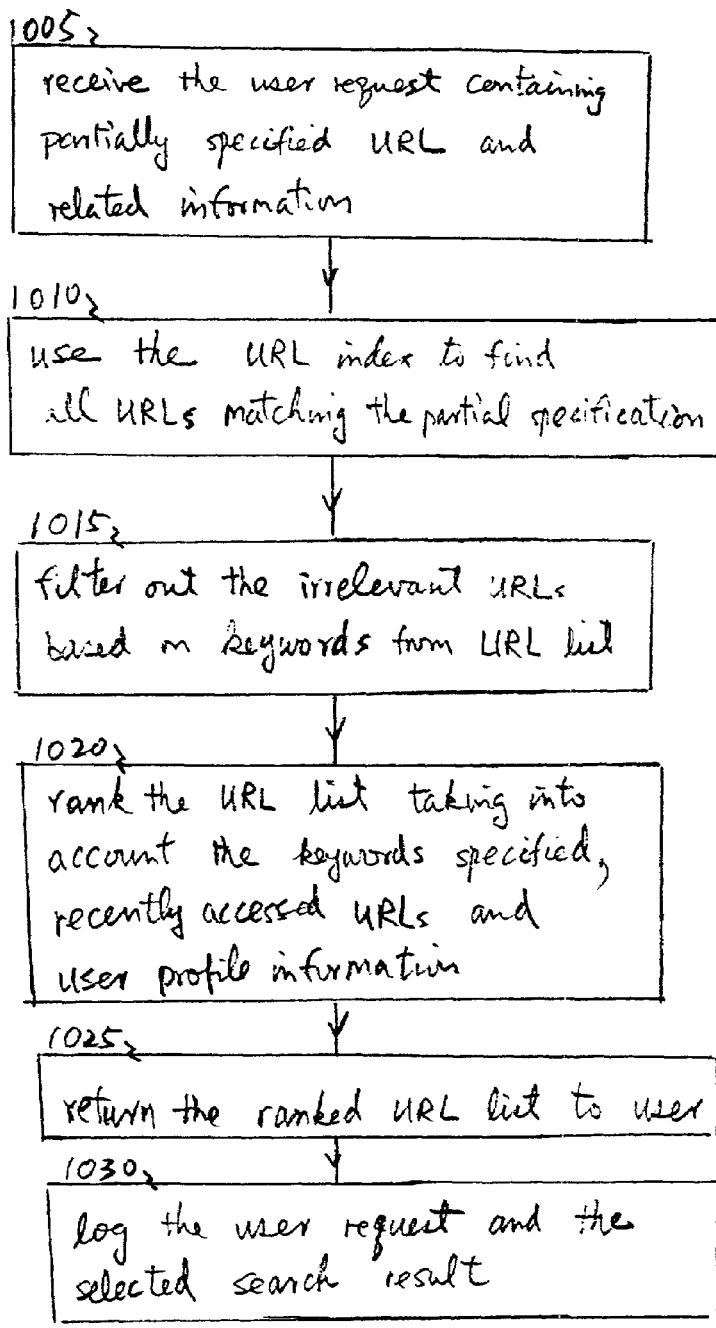
FIG. 10 shows a search request handler for search requests and finding relevant results.

FIG. 10 depicts an example operation of the URL search request handler. In step 1005, the search site server receives the user request containing the partially specified Web site URL address and related information, such as keywords or the recently accessed URL list. In step 1010, the server uses the URL index to find all Web site URLs matching the partially specified URL address. In step 1015, the server filters out the irrelevant URLs from the matching list based on any keywords specified in the search request. That is to say for any Web site on the matching list, if the Web site content does not contain the keywords, it will be removed from the list. (An alternative will be to move it to the bottom on the ranked list.) In step 1020, the URLs on the matching list are ranked by taking into account any keywords specified in the search request, the recently accessed URL list, and user profile. In a preferred embodiment, the URLs on the matching list is first ranked based on the number of keywords matched. For the URLs with the same number of matching keywords, those appearing in the recently accessed URL list will be ranked higher. Finally, for the URLs with the same number of matching keywords and status on the recently accessed list, user profile information can be used as a tie breaker. Those sites which contain keywords with a close match to the user profile will rank higher. In step 1025, the ranked Web site URL list is returned to the requesting user. In step 1030, the server logs the user request and its response to the search request, i.e. which Web site gets selected from the search result.

In the above exemplary routine of the URL search request handler, a fuzzy search incorporating the use of fuzzy logic can be used to conduct searches based on incorrectly spelled URL addresses. Fuzzy logic is a computing technique that is a superset of conventional Boolean logic for handling the concept of partial truth (truth values between "completely true" and "completely false") and as a means to model the uncertainty of natural language. While in Boolean logic the numbers 0 and 1 are used to represent extreme cases of truth (for example, "wide" or "narrow"), fuzzy logic also includes the various states of truth between a comparison of the two cases (0.45 of wideness). Applying this example to the present invention, looking at FIG. 8, if the user conducts a search based on a URL address that is misspelled, such as www.amathon.com, the URL search request handler will still return a list of search results based on partial matches to the web-site URL index, taking to account any keywords specified by the user, the user's recently accessed URL list, and user profile for ranking of the results. The search results based on the inverted index FIG. 8 would return www.amazon.com, even with the misspelled entry.

Those skilled in the art will also appreciate that many different types of implementation exist on ranking and filtering the URL list returned to the requester. For example, one can design a composite function taking into account the keywords specified in the search request, the recently accessed URL list, the subject of interests, etc., to rank the search result. Different weights can be assigned to each factor. For example, a composite function can be of the form w1*(number of matching keywords)+w2* (number of matching subject interests)+w3 (if the Web site appears in the recently accessed URL list), where w1, w2 and w3 are different weights.

According to another embodiment of the invention, a browser is not used to provide the recently accessed URL list of a user. Instead, a proxy server will track the access pattern of each user and maintain the recently accessed URL list of each user. When the search site returns the search result for the partially specified Web site URL address, the proxy server uses the recently accessed URL list to rerank the search results provided by the search site. This can be done in a similar way to step 1020 of FIG. 10.

According to another embodiment of the present invention, the server node operating the search site determines the peer group and derives useful information from the peer group of each user to further refine the ranking of the search results. For example, the user group can be defined based on similar subject of interests and/or interests on content keywords of Web sites. It can also be based on the user's Web address, e.g. all users from ibm.com can be treated as one peer group. Other user groups can be based on criteria such as all the employees of a company, residents of a municipality, members of a household, or subscribers to the same Internet Service Provider (ISP). Furthermore, an alternative approach to derive information from the peer group is to derive the additional URLs accessed by the peer group and add them to the corresponding recently accessed URL list (525) of the user or to derive the additional subjects of interests from the peer group and add them to the corresponding subject of interests (550) of the user.

There are also numerous ways a proxy server can participate in ranking the search results. For example, the proxy server uses Web sites accessed by all users (not the requester) as an input for ranking search results. The access frequency can also be useful information. Web sites that never get accessed by any users are less likely to be a search target, while popular Web sites are more likely to be a URL search target.

Having described preferred embodiments of a system and method for providing service for searching website addresses according to the present invention, it is noted that modifications and variations can be made by persons skilled in the art in light of the above teaching. Numerous modifications and variations of the present invention are possible in light of the above teachings. It is therefore to be understood that, within the scope of the appended claims, the present invention can be practiced in a manner other than as specifically described herein.

What is claimed is:

1. A method for searching for a partially specified Uniform Resource Locator (URL) address, comprising:
    receiving a user request, from a user, comprising the partially specified URL address;
    invoking a URL search request handler to search for the partially specified URL address within an inverted index of web site URLs;
    invoking a web search request handler to rank search results of the search for the partially specified URL address based on one or more keywords specified in the user request, a list of recently accessed URLs, and a user profile; and
    returning the search results to the user comprising a list of URL addresses based on the search for the partially specified URL and ranked based on the one or more keywords specified in the user request, the list of recently accessed URLs, and the user profile.

2. The method of claim 1, wherein the inverted index of web site URLs is indexed from a database of web site URLs.

3. The method of claim 1, wherein the inverted index of web site URLs comprises a list of partially specified URL address and an associated list of web site URLs that is represented by the partially specified URL address.

4. The method of claim 1, wherein the partially specified URL address is an incomplete URL address including a wildcard.

5. The method of claim 1, wherein ranking the search results comprises filtering the search results.

6. The method of claim 1, wherein the partially specified URL address is a misspelled URL address.

7. The method of claim 1, wherein the inverted index of web site URLs indexes URL addresses against single characters and strings of characters that appear in the text of the URL address.

8. The method of claim 1, wherein the step of receiving a user request further comprises receiving one or more search terms from the user, wherein the search terms are used by the web search request handler as user search data.

9. The method of claim 8, wherein the step of invoking a web search request handler further comprises comparing the search terms against meta information of web sites.

10. The method of claim 1, further comprising, retrieving the user search data from a user profile database of demographic information relating to the user that the user has previously provided during a registration process, prior to invoking the web search request handler.

11. The method of claim 10, wherein the user search data is clustered within the user profile database according to one or more user peer group where information learned from one user in the user peer group is applied to each of the other users in the peer group.

12. The method of claim 11, wherein the user search data comprises data collected by a proxy server that the user has recently used to access web sites.

13. A system for searching for a partially specified Uniform Resource Locator (URL) address, comprising:
- a server node to receive a user request, from a user, comprising the partially specified URL address;
- a URL search request handler to search for the partially specified URL address within an inverted index of web site URLs;
- a web search request handler to rank search results of the search for the partially specified URL address based on one or more keywords specified in the user request, a list of recently accessed URLs, and a user profile; and
- a client station to display the search results to the user, the search results comprising a list of URL addresses based on the search for the partially specified URL and ranked based on the one or more keywords specified in the user request, the list of recently accessed URLs, and the user profile.

14. The system of claim 13, wherein the inverted index of web site URLs is indexed from a database of web site URLs.

15. The system of claim 13, wherein the inverted index of web site URLs comprises a list of partially specified URL address and an associated list of web site URLs that may be represented by the partially specified URL address.

16. The system of claim 13, wherein the partially specified URL address is an incomplete URL address including a wildcard.

17. The system of claim 13, wherein the ranked search results are filtered search results.

18. The system of claim 13, wherein the partially specified URL address is a misspelled URL address.

19. The system of claim 13, wherein the inverted index of web site URLs indexes URL addresses against single characters and strings of characters that appear in the text of the URL address.

20. The system of claim 13, wherein the user request additionally comprises one or more search terms and the search terms are used by the web search request handler as user search data.

21. The system of claim 20, wherein the search terms are used by the web search request handler are compared against meta information of web sites.

22. The system of claim 13, wherein the user search data is retrieved from a user profile database of demographic information relating to the user that the user has previously provided during a registration process.

23. The system of claim 22, wherein the user search data is clustered or partitioned within the user profile database according to one or more user peer group where information learned from one user in the user peer group is applied to each of the other users in the peer group.

24. The system of claim 13, wherein the user search data comprises data collected by a proxy server that the user has recently used to access web sites.

25. A program storage device readable by machine, tangibly embodying a program of instructions executable by the machine to perform the method steps of:
- receiving a user request, from a user, comprising a partially specified Uniform Resource Locator (URL) address;
- invoking a URL search request handler to search for the partially specified URL address within an inverted index of web site URLs;
- invoking a web search request handler to rank search results of the search for the partially specified URL address based on one or more keywords specified in the user request, a list of recently accessed URLs, and a user profile; and
- returning the search results to the user comprising a list of URL addresses based on the search for the partially specified URL and ranked based on the one or more keywords specified in the user request, the list of recently accessed URLs, and the user profile.

26. The program storage device of claim 25, wherein the inverted index of web site URLs comprises a list of partially specified URL address and an associated list of web site URLs that may be represented by the partially specified URL address.

27. The program storage device of claim 25, wherein the partially specified URL address is an incomplete URL address including a wildcard.

* * * * *